United States Patent
Krenzin et al.

(10) Patent No.: US 7,854,280 B2
(45) Date of Patent: Dec. 21, 2010

(54) PREASSEMBLY UNIT FOR THE DRIVE OF AN INDUSTRIAL TRUCK

(75) Inventors: Marcel Krenzin, Bad Bramstedt (DE); Helmut Lohmann, Nartun-Gyhum (DE); Ulf Schipper, Molfsee (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 456 days.

(21) Appl. No.: 11/847,583

(22) Filed: Aug. 30, 2007

(65) Prior Publication Data

US 2008/0053744 A1 Mar. 6, 2008

(30) Foreign Application Priority Data

Sep. 6, 2006 (DE) ........................ 10 2006 041 684

(51) Int. Cl.
  *B62B 3/06* (2006.01)
  *B66F 9/075* (2006.01)
(52) U.S. Cl. ........................ 180/13; 280/43.12
(58) Field of Classification Search ............. 180/11, 180/12, 13; 280/124.135–124.136, 43.12
See application file for complete search history.

(56) References Cited

U.S. PATENT DOCUMENTS

| | | | | |
|---|---|---|---|---|
| 2,359,493 A | * | 10/1944 | Schreck | 254/2 B |
| 2,370,866 A | * | 3/1945 | Lewis | 180/13 |
| 2,417,394 A | * | 3/1947 | Framhein | 254/2 B |
| 2,598,151 A | * | 5/1952 | Warshaw | 254/2 B |
| 3,249,170 A | * | 5/1966 | Quayle | 180/19.2 |
| 3,515,233 A | * | 6/1970 | Stammen | 180/13 |
| 4,616,730 A | * | 10/1986 | Strehler et al. | 180/253 |
| 4,750,579 A | * | 6/1988 | Jarl et al. | 180/24.02 |

(Continued)

FOREIGN PATENT DOCUMENTS

DE 44 34 327 A1 3/1996

(Continued)

OTHER PUBLICATIONS

Scheffels, G: Flurforderzeuge. In: F+H Fordern und Heben 51 (2001), No. 5, 2 pages.

*Primary Examiner*—Lesley Morris
*Assistant Examiner*—Wesley Potter
(74) *Attorney, Agent, or Firm*—Vidas, Arrett & Steinkraus

(57) ABSTRACT

A preassembly unit for the drive of an industrial truck, with a fifth wheel on which the driving wheel is rotatably mounted around a horizontal axis and which on its part is rotatably mounted in a bearing member around a vertical axis, a drive motor arranged on the fifth wheel, which is coupled with a driving shaft of the driving wheel via a gearbox, optionally a steering motor on the bearing member in order to turn the fifth wheel in the bearing member around the vertical axis, a parallel rod assembly between the bearing member and a frame of the industrial truck, which permits an essentially vertical movement of the preassembly unit in relation to the frame, and a spring arrangement between the bearing member and a frame-fixed section, wherein at least one upper drag rod of the parallel rod assembly is articulated on the lower end of a separate attachment section, which forms an interface with a counter-attachment position on the frame by attachment positions, and that at least one spring acts between a shoulder of the bearing member and an abutment of the attachment portion below the attachment positions.

8 Claims, 3 Drawing Sheets

U.S. PATENT DOCUMENTS

| | | | |
|---|---|---|---|
| 4,754,837 A * | 7/1988 | McCormick | 180/253 |
| 4,801,238 A * | 1/1989 | Pezzolato | 414/607 |
| 5,113,960 A * | 5/1992 | Prinz | 180/65.51 |
| 5,820,163 A * | 10/1998 | Thacker et al. | 280/775 |
| 6,488,297 B2 | 12/2002 | Murase | |
| 7,267,349 B2 * | 9/2007 | Sica et al. | 280/124.128 |

FOREIGN PATENT DOCUMENTS

| | | |
|---|---|---|
| EP | 0 209 502 A2 | 1/1987 |
| EP | 329504 A * | 8/1989 |
| EP | 0 383 254 A2 | 2/1990 |
| EP | 658510 A1 * | 6/1995 |
| GB | 2 293 363 A | 3/1996 |
| WO | WO 9422761 A1 * | 10/1994 |

* cited by examiner

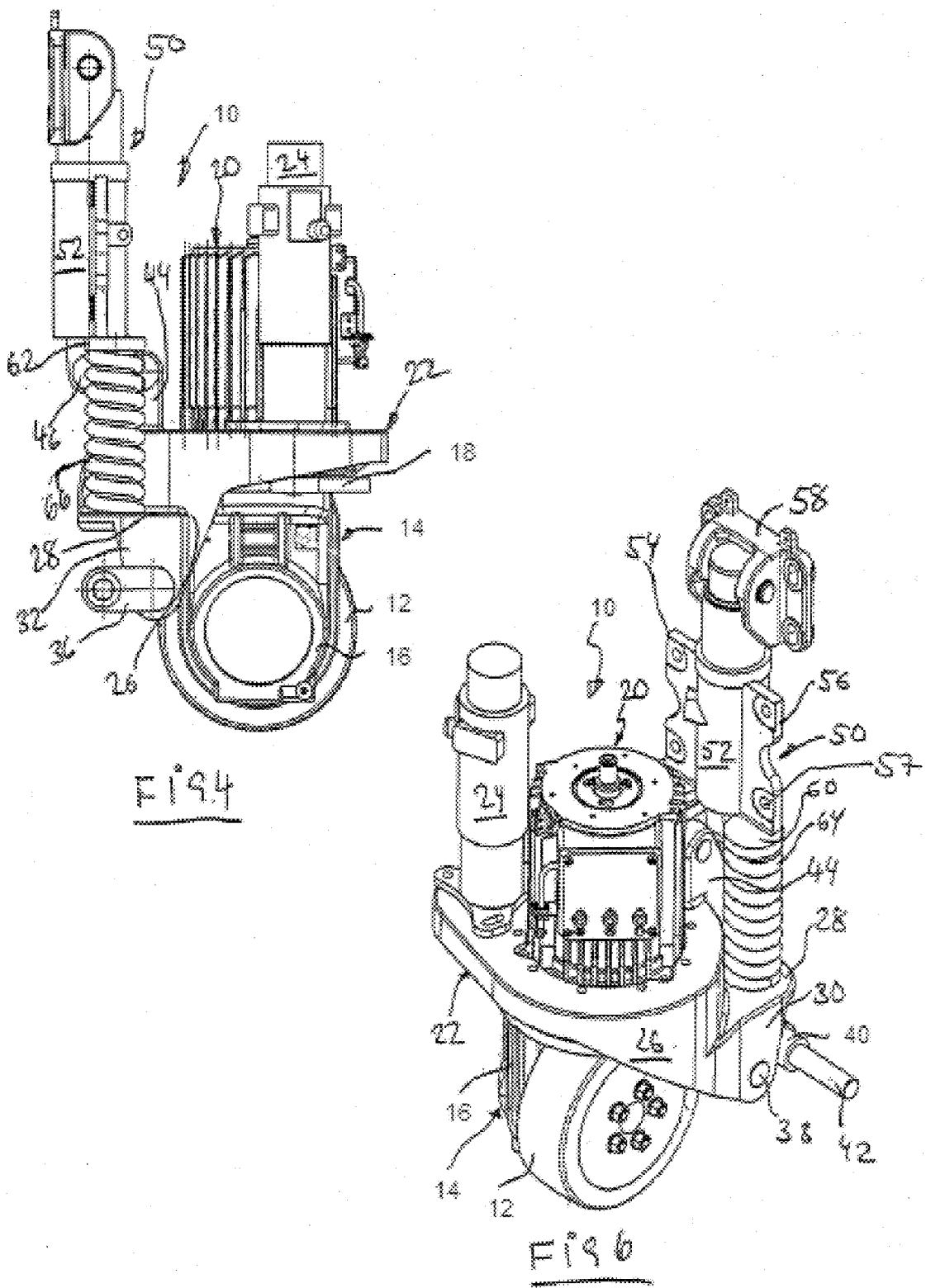

PREASSEMBLY UNIT FOR THE DRIVE OF AN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Irrespective whether industrial trucks have a three wheel chassis, four wheel chassis or five wheel chassis, only one single driving wheel is provided at most, which is also a steered wheel at the same time in most cases. For this purpose, the driving wheel is rotatably mounted around a horizontal shaft in a so-called fifth wheel, which is rotatably mounted around a vertical shaft in a second bearing member. With the aid of a steering drive, the fifth wheel is pivoted in relation to the frame-fixed or not turnable bearing member. On the fifth wheel sits a drive motor, which is pivoted together with it and which drives the driving wheel, via a conical wheel- or spur wheel gearbox, for instance.

The driving wheel is often not cushioned, a certain cushioning effect taking place via the tires. It is also known to suspend the driving wheel in a spring-cushioned way and optionally to load or relieve it depending on the load.

In industrial trucks with driver seat, the spring-cushioned suspension of the driving wheel is desired, so that the driver is not subjected to strong shocks. From U.S. Pat. No. 6,488,297 B2, the entire contents of which is incorporated herein by reference, a suspension for an industrial truck has become known, in which that bearing member, in which the bearing member for the driving wheel is rotatably mounted around a vertical axis, is suspended vertically movable by means of a parallel rod assembly. A spring acts on the first bearing member and thus it counter-acts the upward movement of the first bearing member.

The present invention is based on the objective to provide a preassembly unit for the drive of an industrial truck which permits a selectionable connection with the frame of an industrial truck, irrespective of its actual construction. The construction is to be compact, at spring-cushioned suspension of the driving wheel in particular.

BRIEF SUMMARY OF THE INVENTION

In the preassembly unit of the present invention, at least one upper drag rod of the parallel rod assembly is articulated on the lower end of a separate attachment section, which forms an interface with a counter-attachment position on the frame by attachment positions. At least one spring is arranged between a shoulder of the bearing member and an abutment of the attachment section below the attachment positions. Preferably, the attachment section has two flanges located in one plane, with attachment holes (57).

Neglecting fixed specifications for the preassembly unit, the same can be realised in any way. The steering may be servo assisted or it may be directly actuated by a drawbar. The preassembly unit can be connected to a low lift truck, a high lift truck or any other industrial truck, and it may replace a non-cushioned drive unit, for instance. The frame of the industrial truck is shaped completely similar with regard to the installation of the drive unit. Correspondingly, different preassembly units (a set) have the same attachment section, irrespective of their actual realisation. Therefore, one embodiment of the present invention provides to provide a set of different preassembly units which each have the same attachment section for the installation on the frame of the industrial truck.

According to one embodiment of the present invention, the attachment section is formed in one piece with a cylinder shell of a lifting cylinder, the piston rod of which acts on the load portion of an industrial truck above the attachment section, For instance, such a preassembly unit serves as a drive for a low-lift industrial truck with spring cushioned driving wheel suspension.

According to a further embodiment of the present invention, the bearing member is provided with two parallel spaced bearing lugs, between which a longitudinal member with an axial through-bore is arranged, a pipe for instance. The lower drag rods are fixedly connected to that member, Through its bore, a bearing shaft is lead through. One of the lower drag rods is pivotally mounted on the inner side of the bearing lug and the other one on the outer side of the other bearing lug. In such a mounting, the lower drag rods and the member attached between them form a structural unit which permits a stable vertical guiding of the driving wheel at vibrations. The structural unit may be a welded structural unit or even a cast piece. In addition, it may be pre-fabricated in a simple manner and subsequently be joined with the bearing member. This is because the first one of the two lower drag rods is on the other side of the assigned bearing lug than is the other drag rod, so that by simply moving it laterally on the bearing shaft, the whole unit of fifth wheel, bearing member and driving wheel is released from the lower articulation. Thus, installation and removal of the preassembly unit can be performed extremely simply, even at narrow spatial conditions.

According to one embodiment of the present invention, it is provided that the bearing member has a bearing lug standing upward approximately in the centre between the lower bearing lugs, on which one single upper drag rod is articulated, which is laterally articulated to a flange of the attachment section which is detachably connectable to the counter-attachment section of the frame. This construction limits the number of levers for the parallel guiding to three. Thus, sufficient space is also created in order to arrange a spring on each side of the upper bearing lug, which according to one embodiment is supported on the lower end on an approximately horizontal plate-shaped section of the first bearing member. The articulation of the single upper lever is preferably such that it also permits the sideways movement of the complete drive unit in the frame for detaching it.

For low-lift industrial trucks it is known to actuate the load wheels which are mounted on the front end of load arms via a drawer- or presser rod assembly. The rod assembly is articulated on a lever with plural arms, which on its part is rotatably mounted on the load portion. An additional aim of the lever is articulated on the frame of the drive portion. When the load portion is lifted with the aid of the lifting cylinder, this results in a swivelling of the lever at the same time, which acts on the rod assembly towards the load wheels and pivots the same downward with respect to the load arms, so that the load arms can be lifted parallel to each other and being also supported on the front end. In this context, one embodiment of the present invention provides that the axles of the lower drag rods of the parallel rod assembly and the articulation of the levers on the frame are coaxial. Preferably, the levers are pivotally mounted on the bearing shaft. Thus, a simple and compact construction for the suspension of the driving wheel is achieved.

BRIEF DESCRIPTION OF THE SEVERAL VIEWS OF THE DRAWINGS

The present invention is explained in the following by means of an example of its realisation, depicted in drawings.

FIG. 4 shows the side view at the left side of the preassembly unit of FIG. 2.

FIG. 6 shows the preassembly unit of FIGS. 2 to 4 in a perspective view.

DETAILED DESCRIPTION OF THE INVENTION

Figure 1:
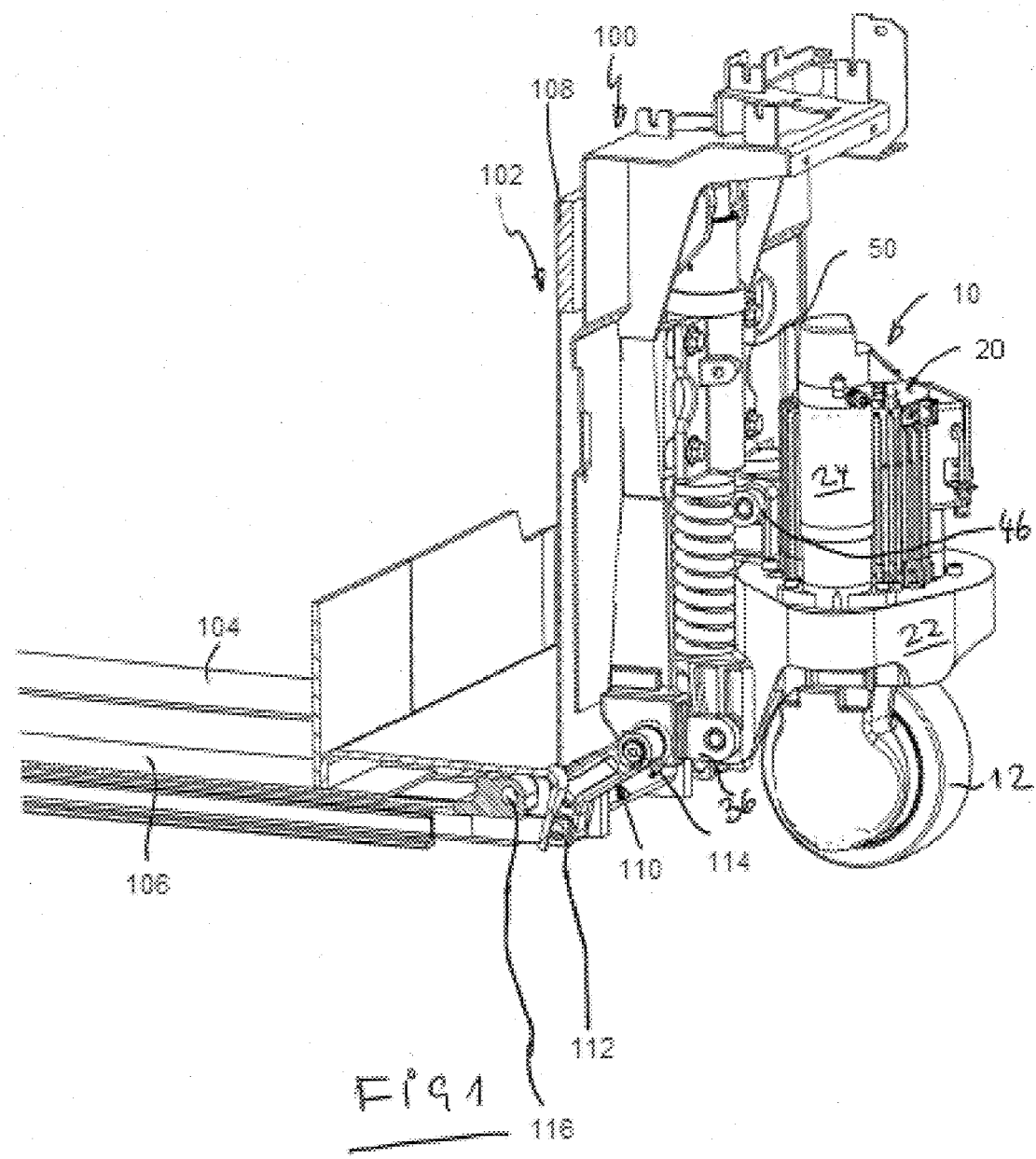
FIG. 1 shows a preassembly unit of the present invention in a low-lift industrial truck in a perspective view.
Figures 2, 3:
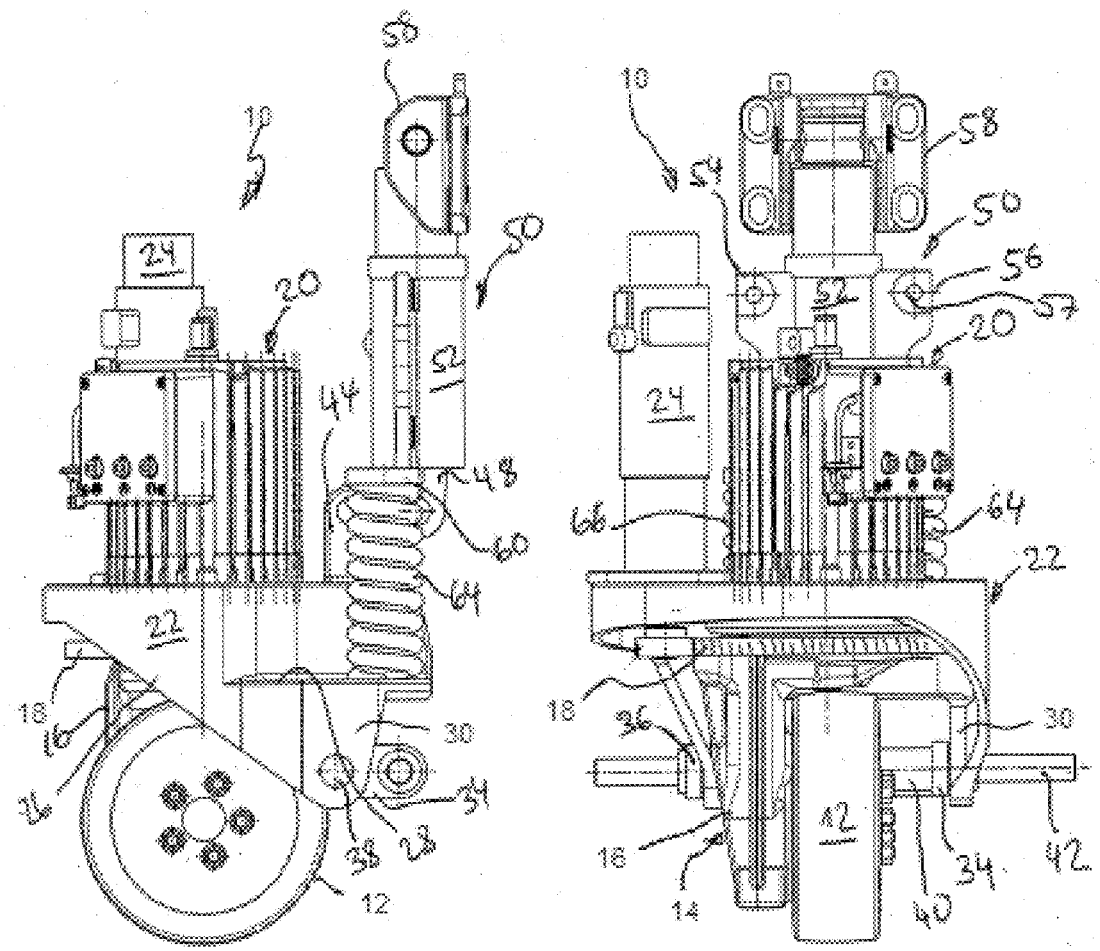
FIG. 2 shows the side view at the right side of the preassembly unit of FIG. 1.
FIG. 3 shows the front view of the preassembly unit of FIG. 2.
Figure 5:
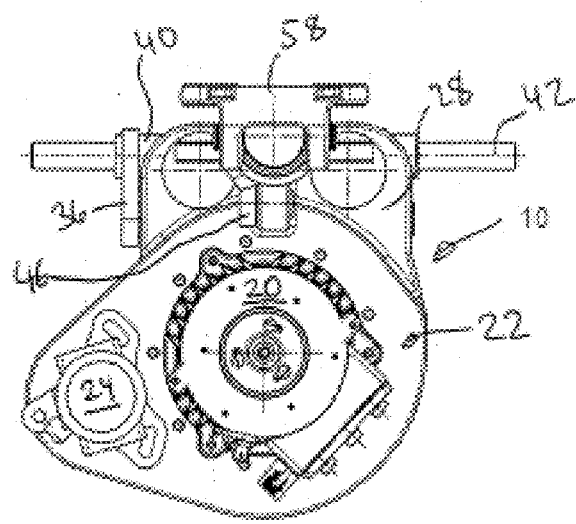
FIG. 5 shows the top view on the preassembly unit of FIG. 2.

While this invention may be embodied in many different forms, there are described in detail herein a specific preferred embodiment of the invention. This description is an exemplification of the principles of the invention and is not intended to limit the invention to the particular embodiment illustrated In FIG. 1, a low-lift industrial truck is partially depicted. It has a drive portion and a load portion. The drive portion is only represented with a frame 100 and a drive unit 10. The drive unit 10 will be described in more detail below by means of the FIGS. 2 to 6.

A load portion 102 has two parallel wheel arms 104, 106. Further, a battery accommodation can be recognised, which is fixedly connected to the wheel arms 104, 106. It will not be further dealt with the same. The part of the battery accommodation drawn upward, which is designated with 108, is connected with the lifting cylinder of the drive portion 10, as will be shown later.

A three-arm lever 110 is pivotally mounted on the load portion 102 around a horizontal axis at 112. On the opposing side, a corresponding lever is provided. One arm of the lever 110 is pivotally articulated on the flame 100 at 114. A third arm of the lever is articulated at 116 on a presser rod, which is lead inside the wheel arm 106. The same applies for the wheel arm 104. At the end of the wheel arms 104, 106, there are load wheels (not shown), which are mounted in a rocker which is connected with the respective presser rod. When the load portion 102 is lifted, the lever 110 pivots in the clock direction and by this it exerts a pressure on the presser rod. This kinematics is commonly known in low-lift industrial trucks.

In FIGS. 2 to 6, the drive unit 10 is depicted in more detail. In FIG. 1, the industrial truck is a three-wheel vehicle. It may be an usual handlebar- or drawbar-steered industrial truck, also with a four-wheel or five-wheel chassis.

A driving wheel 12 is rotatably mounted in a fifth wheel 14 around a horizontal axis. The fifth wheel 14 has an angle gearbox 16 and an upper horizontal toothed ring 18, on which a drive motor 20 is attached. The drive motor 20 may be a three-phase current motor or even a direct current motor, which brings the driving wheel 12 into rotation via the gearbox 16. The toothed ring 18 is rotatably mounted around a vertical axis in a bearing member 22. On the top side of the bearing member 22 sits upright a steering motor 24, which turns the fifth wheel 14 around the vertical axis when it is correspondingly triggered via a steering transmitter. The described components are conventional and therefore they have not to be discussed further in detail.

As results from the figures, the bearing member 22 has an upper horizontal section and a skirt 26 extending downward from the same in various degrees, which is partly formed in the shape of an arc of a circle. However, it is partly open on the rear side and there it forms a horizontal shoulder 28 below the disc 18. From the same, bearing lugs 30, 32 stand downward. They are approximately parallel and in a distance to each other. As becomes clear from the figures, relatively short drag rods are articulated on the beatings lugs 30, 32. On the bearing lug 30 a drag rod 34 is articulated, and on the bearing lug 32 a drag rod 36. The drag rod 36 is articulated on the outer side of the bearing lug 32, and the drag rod 34 on the inner side of the bearing lug 30. The articulation takes place via rotational necks in corresponding bores of the bearing lugs 30, 32, which are not shown in more detail. Only in FIGS. 2 and 6, a bearing neck can be recognised at 38.

The drag rods 34, 36 are welded together with a pipe 40. They form an entity with the pipe. Through the pipe, a bearing rod or -shaft 42 is guided through, which is attached on the frame 100 of the industrial truck (FIG. 1).

On the top side of the bearing member 22, an upper bearing lug 44 is attached on the rear side of the drive motor 20, which is arranged approximately in the centre between the lower bearing lugs 30, 32. On the bearing lug 44, one single upper drag rod 46 is articulated, which is articulated on a lower lug 48 of an attachment section 50 at its other end. Thus, the drag rods 34, 36 and 46, the bearing lugs 30, 32 and the attachment section 50 form a parallel rod assembly, which permits an approximately vertical movement of the drive unit 10.

The attachment section 50 has attachments flanges 54, 56 located in one plane on opposing sides of a shell of a lifting cylinder 52, formed in one piece therewith, each with two attachment bores for attachment on a wall section of the vehicle frame 100. On the piston rod of the lifting cylinder 52, a flange plate 58 is attached for connection with the load portion 102 of the industrial truck.

Below the flanges 54, 56, disc-shaped abutments 60, 62 for springs 64, 66 are arranged. The springs 64, 66 are supported at the lower end on a plate section of the shoulder 28.

In order to dismount the drive unit 10, it is only necessary to bring the bearing necks out of engagement with the bearing lugs 30, 32 through a small sideways movement of the drive unit 10. When the bearing rod 42 is pulled out of the pipe 40, the drive unit is free and it can be removed. Naturally, this functions only when the fastening of the flanges 54, 56 on the frame has been released before.

As results from FIG. 1 in particular, the lower drag rods 34, 36 on the frame 100 of the drive portion are mounted on the same axle as the one arm of the lever 110 for the lifting rod assembly. Thus, the construction expenditure is kept very low and the drive unit is realised compactly.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A preassembly unit for the drive of an industrial truck, comprising:
    a fifth wheel on which the driving wheel is rotatably mounted around a horizontal axis and which on its part is rotatably mounted in a bearing member around a vertical axis;
    a drive motor arranged on the fifth wheel, which is coupled with a driving shaft of the driving wheel via a gearbox;
    a parallel rod assembly between the bearing member and a frame of the industrial truck, which permits an essentially vertical movement of the preassembly unit in relation to the frame,
    a spring arrangement between the bearing member and a frame-fixed section;
    in which at least one upper drag rod (46) of the parallel rod assembly is articulated on the lower end of a separate attachment section (50), which forms an interface with a counter-attachment position on the frame by attachment positions, and that at least one spring (64) acts between a shoulder (28) of the bearing member (22) and an abutment (60) of the attachment section (50) below the attachment positions;
    further in which the attachment section (50) has a bearing lug pointing downward and the shoulder of the bearing member (22) has an upper bearing lug (44) pointing upward, for the at least one upper drag rod (46), and
    further in which the bearing member (22) has two parallel spaced downward standing bearing lugs (30, 32), two lower drag rods (34, 36) of the of the parallel rod assembly are welded to a hollow pipe which is arranged between the downward standing bearing lugs (30, 32) and through which a bearing shaft (42) extends.

2. A preassembly unit according to claim 1, characterised in that the attachment section (50) has two flanges (54, 56) located in one plane, with attachment holes (57).

3. A preassembly unit according to claim 2, characterised in that the abutment for the spring is provided below the flanges.

4. A preassembly unit according to claim 1, characterised in that two parallel spaced springs (64, 66) are provided.

5. A preassembly unit according to claim 1, characterised in that the upper drag rod (46) is bearing mounted on the upper bearing lug (44) at the same side as one of the lower drag rods, bearing mounted on the outside of a facing one of the downward standing bearing lugs.

6. A preassembly unit according to claim 1, characterized in that an arm of a lever (110) is rotatably mounted on a load portion (102) of the industrial truck, and the axles of the lower drag rods (34, 36) and the articulation of the lever (110) on the frame (100) are coaxial.

7. A preassembly unit according to claim 6, characterized in that the lever (110) is pivotally mounted on the bearing shaft (42).

8. The preassembly unit according to claim 1, further including a steering motor on the bearing member in order to turn the fifth wheel in the bearing member around the vertical axis.

\* \* \* \* \*